March 11, 1924. 1,486,590
E. E. LANDAHL
CONVEYING APPARATUS
Filed Feb. 23, 1922 3 Sheets-Sheet 1
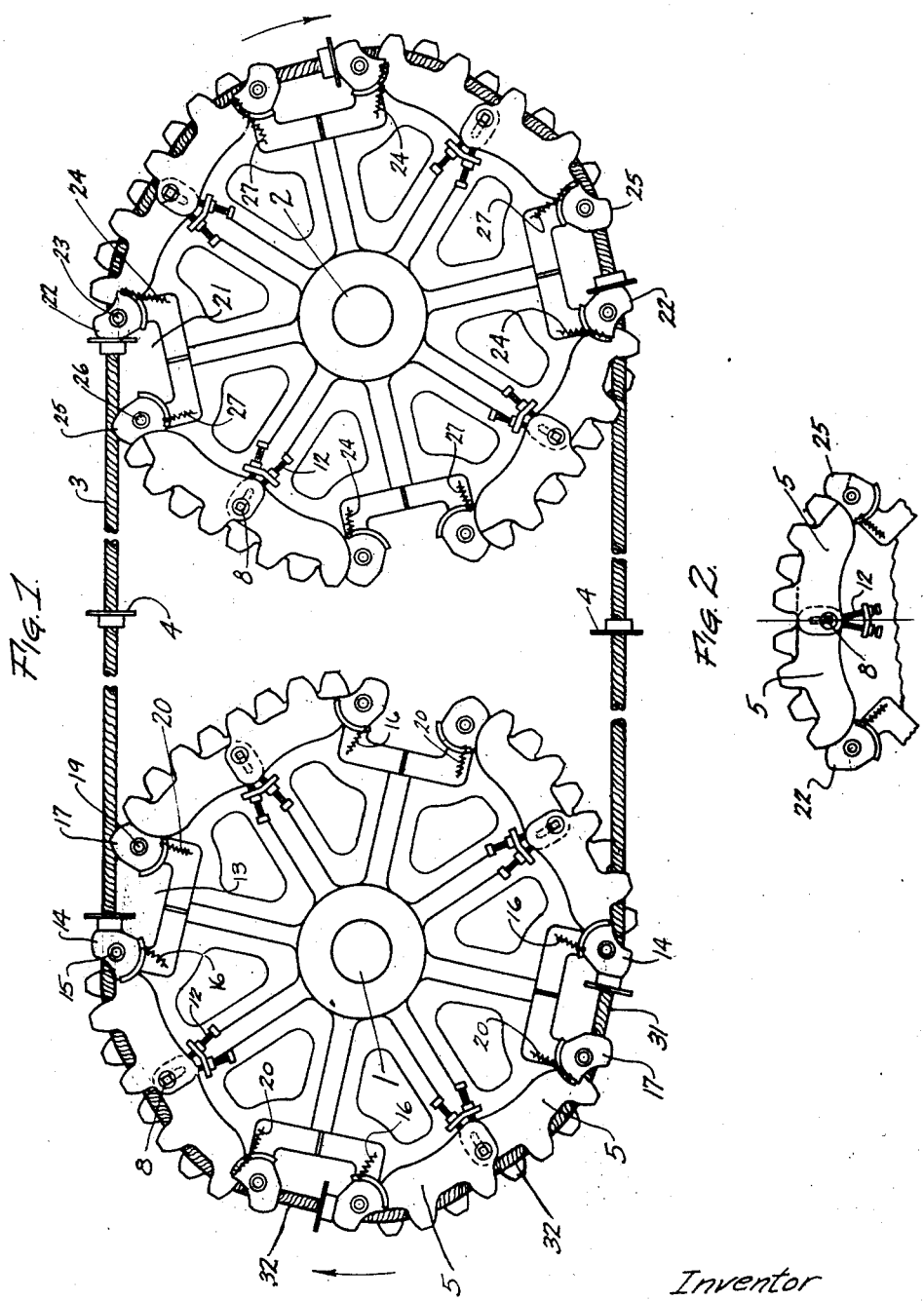
Inventor
Eugene E. Landahl
By Arthur F. Durand
Atty

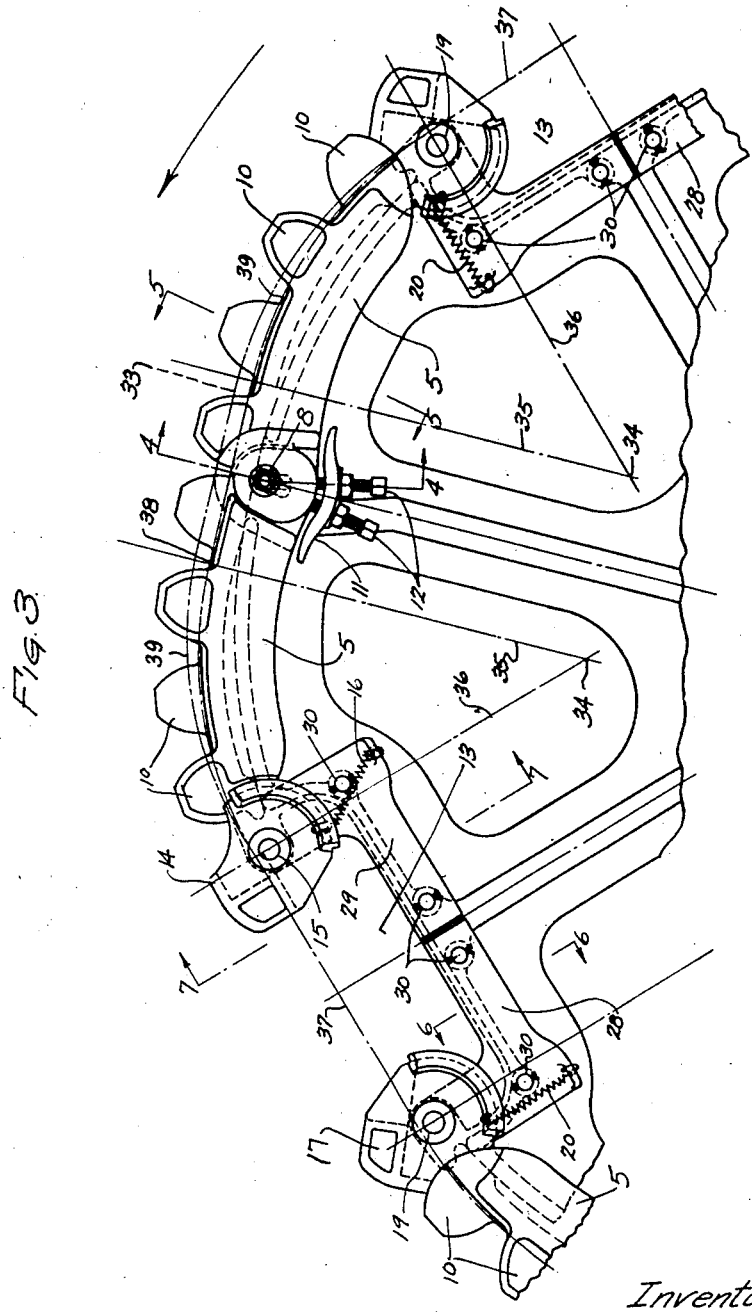

March 11, 1924.
E. E. LANDAHL
1,486,590
CONVEYING APPARATUS
Filed Feb. 23, 1922   3 Sheets-Sheet 3
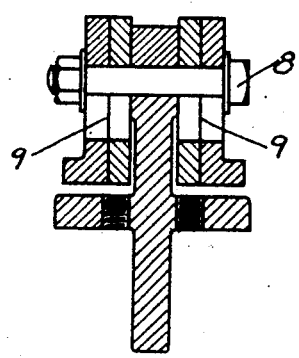
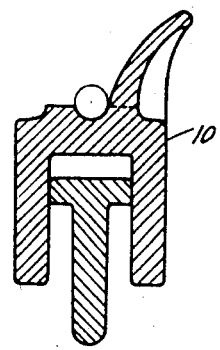
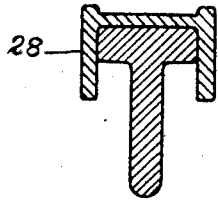
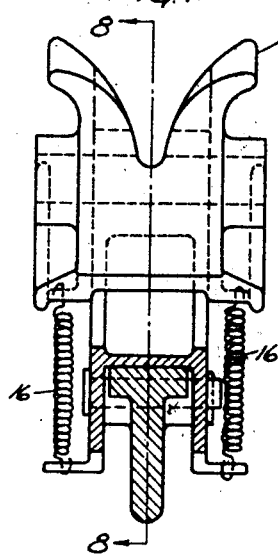
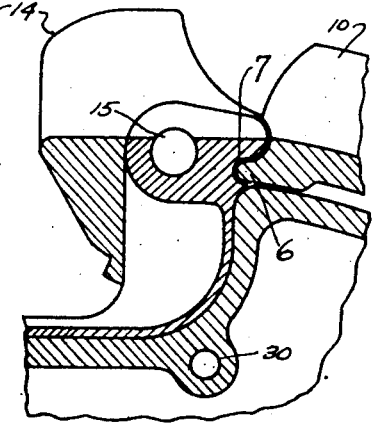
Inventor
Eugene E. Landahl
By Arthur F. Durand
Atty.

Patented Mar. 11, 1924.

1,486,590

UNITED STATES PATENT OFFICE.

EUGENE E. LANDAHL, OF OAK PARK, ILLINOIS, ASSIGNOR TO WEBSTER MFG. COMPANY, OF CHICAGO, ILLINOIS, A CORPORATION OF OHIO.

CONVEYING APPARATUS.

Application filed February 23, 1922. Serial No. 538,469.

*To all whom it may concern:*

Be it known that I, EUGENE E. LANDAHL, a citizen of the United States, and a resident of Oak Park, Cook County, Illinois, have invented a certain new and useful Improvement in Conveying Apparatus, of which the following is a specification.

This invention relates to conveyors of that kind in which a flexible member, such as an endless cable, is arranged to travel around wheels of any suitable character, and in which the cable or other flexible member is provided at intervals with means, such as plates or flights, for pushing or carrying or conveying the materials along in the desired direction, one of said wheels being driven to operate the conveyor in the desired manner. In the use of conveyors of this character, one difficulty encountered is that the cable or other flexible member becomes stretched, and this interferes with the proper operation of the apparatus and in some cases requires the removal of the cable or other flexible means in order that the slack may be taken up to make it run properly upon and between the wheels.

Generally stated, therefore, the object of the invention is to provide an improved construction and arrangement whereby the slack or stretch in the cable or other flexible member can be taken up in an easy and convenient manner, and in a way that will make the endless cable or other flexible member run taut and smooth from one wheel to the other, so that the flights or plates on the cable will be in step with the gaps which receive them on the wheels, thus ensuring against some of the difficulties heretofore encountered in the use of conveying apparatus of this particular character.

It is also an object to provide certain details and features of construction tending to increase the general efficiency and the desirability of a conveying apparatus of this particular construction.

To this and other useful ends the invention consists in matters hereinafter set forth and claimed and shown in the accompanying drawings in which—

Figure 1 is a side elevation of the two wheels and the endless cable or belt which is supported by said wheels, and which is provided with plates or flights for pushing or carrying the materials along, having means embodying the principles of the invention for tightening the cable or belt when the same becomes stretched by continued use.

Figure 2 is a fragmentary detail view of a portion of one of said wheels.

Figure 3 is an enlarged side elevation of a portion of one of said wheels.

Figure 4 is an enlarged section on line 4—4 in Figure 3.

Figure 5 is a similar section on line 5—5 in Figure 3.

Figure 6 is an enlarged section on line 6—6 in Figure 3.

Figure 7 is an enlarged section on line 7—7 in Figure 3.

Figure 8 is an enlarged fragmentary detail view of a portion of one of said wheels.

As thus illustrated, the invention comprises a driving wheel having its hub 1 mounted or supported in any suitable or desired manner, and a driven wheel having its hub 2 also supported in any suitable manner, the two wheels being connected by a flexible cable 3 or other suitable means. It will be understood that the apparatus thus provided, said cable of which is provided with plates or flights 4, in the usual manner, can be arranged in any suitable or desired position, depending upon the work to be done. While the apparatus is shown with the cable thereof extending horizontally in the drawings, it will be understood that said cable can extend vertically, or in an inclined manner, if circumstances require. The plates or flights 4 push or carry the materials along in the desired direction, in a manner that will be readily understood.

The means for taking up slack or stretch in said cable are as follows: The outer portions of the wheels have segments 5 which have their end portions 6 held in notches 7 formed on the wheels, and the other ends of said segments are suitably connected together by a transverse bolt 8, one for each pair of segments, with slots 9 in the segments which permit them to move toward and away from the axis of the wheel. These segments have teeth 10 some of which are turned over in one direction, and the others being turned over in the other direction, so that these teeth co-operate to form a sort of groove or channel for the periphery of each wheel, thereby to accommodate the cable and hold it in place. The sides of the wheels are provided with lugs or extension portions 11 in which set screws 12 are inserted to bear against the adjacent ends of the segments, so that the latter can be pushed outward at will, thus in effect increasing the circumference and diameter of the wheel. This will take up the slack or stretch in the cable and will cause the latter to run taut and smooth from one wheel to the other.

Said wheels have notches 13 to accommodate the plates or flights 4 previously mentioned. The driver wheel having the hub 1 is provided with pivoted members 14 which are held in place by bolts 15 and which are adapted to engage the flights 4 to propel the latter and the materials along in the desired direction. Springs 16 are applied to said members 14 to hold them normally in the positions shown, which is the position they occupy while engaging the cable on the wheel. Similar members 17 are pivoted by bolts 19 at the other sides of the notches or spaces 13 previously mentioned. Also, as shown, springs 20 are applied to the members 17 to hold them normally in the position shown where they are not engaging the cable, and these springs yield when said members 17 are subject to the pressure of the cable, as shown; but as soon as the cable is lifted a little from one of the members 17, as the cable leaves the wheel, said member is then pulled by its spring into normal position, thereby to clear the edge of plate or flight 4 as the latter leaves the space 13 which is occupied while traveling around the wheel. It will be seen that the wheel having the hub 2 is also provided with spaces or notches 21 to receive the plates or flights 4 of the conveyor. This is the wheel which is driven by the cable, so that it is practically an idler, and this wheel has pivoted members 22 which are held in place by the bolts 23 and which are engaged by the plates or flights 4 to turn the wheel about its axis. Springs 24 applied to these members 22 normally hold the latter in the position in which they are shown while not engaged with the cable; but while engaging said cable, members 22 then assume the other position shown in Figure 1 of the drawings and remain in this position until released by the cable. This wheel having the hub 2 is also provided with the members 25 which are pivoted thereon by bolts 26 and which are held in their normal positions by their springs 27 suitably applied thereto. These members 25 are held normally by their springs 27 in the positions in which they are shown while not in engagement with the cable, thereby to clear the edges of the plates or flights 4 as the latter enter the spaces or notches 21 previously mentioned. However, wherever the cable is seated on the wheel it presses the members 25 into the other positions shown. As the cable leaves the wheel, the members 22 are pulled into their normal position, by their springs 24, so that the plates or flights 4 may clear or pass these members 22 in leaving the wheel.

Thus means are provided for supporting a cable or other flexible member upon which are carried the plates or flights for pushing or carrying the materials along in the desired direction. In combination therewith, (preferably at points between the spring controlled members for engaging the cable, and between the notches or recesses which are provided in the wheels to receive the flights) means are provided for pushing the cable outward and away from the axes of the wheels, thereby to take up the slack or stretch which may have resulted from use of the apparatus in the required manner. In effect, as previously stated, the circumference or diameter of each wheel is practically increased, from time to time, to the extent necessary to tighten the cable and cause it to run straight and taut from one wheel to the other. In this way, therefore, the cable is tightened and the stretch or slack is taken up without the necessity of other adjustments, so that the axis of the wheel can remain fixed in position in the desired manner, notwithstanding the provision of means for tightening the cable when it begins to sag between the two wheels, or when it becomes stretched by continued use.

It will be understood, of course, that the means thus provided for tightening a cable or other flexible member, or any endless belt, thereby to take up the slack or stretch therein, can be employed for any suitable or desired purpose. In the drawings, as described, the invention is shown as being employed for the purpose of tightening the cable of a conveyor, but it can be used for tightening a belt in other situations as well, and is not limited to use for the particular purpose shown and described. The endless belt, of whatever description, or for whatever purpose, is tightened to take up the slack by practically expanding either wheel or both to a larger diameter and circumference, by movable means provided for this purpose on the supporting wheel, or on both wheels, as circumstances may require.

In Figure 3, the portion of the wheel having the hub 1 is shown, and it will be seen that the sections 28 and 29 upon which the members 14 and 17 are mounted, respectively, are held in place by transverse pins 30 which are movable, in any suitable or desired manner, to permit the removal of said sections when this is necessary or desirable. These sections 28 and 29 are provided, as previously explained, with the notches 7 for the ends 6 of the segments 5 which constitute a part of the means for expanding the wheel to tighten the cable thereon. It will be understood that the other wheel is constructed in a similar manner, but it is obvious that the adjusting means for taking up the slack or stretch in the cable can be applied to either wheel alone, as well as to both, depending upon circumstances and requirements.

In Figure 3, it will be seen that the fragment of the wheel having the hub 1, which is the driver wheel, is turned around to show the other side, so that it appears to be rotated in a direction opposite to that shown in Figure 1, but it will be understood that this wheel always rotates in the direction to enable the yielding members 14 (which are in the nature of bifurcated yielding teeth on a sprocket wheel) to be always in position to engage and push the flights 4 along in the manner described, while the pivoted teeth 17 travel around ahead of said flights and move out of the way to permit the flights or buckets 4 to depart from the spaces or gaps 13 which break the annular continuity of the wheel at regular intervals in the circumference thereof. In Figure 2 a section of the driven wheel having the hub 2 is shown, and in this view the screws 12 are shown as having been tightened to force the two segments 5 outward, this being accomplished, as explained, by forcing the toggle-joint formed by the bolt 8 outward and away from the axis of the wheel. Thus the segments 5 are arranged in pairs, with a joint or point of articulation between the members of each pair, and with the outer ends of the members of each pair pivoted in seats or notches 7 as previously explained. With this construction, very obviously, the adjustment of the peripheral portions of the wheel is accomplished to tighten the cable or other belt thereon, and to take up the slack or stretch in said belt, without causing any acute or sharp bending of the cable, inasmuch as the forcing outward of the joint at 8 merely bends the cable slightly. In this way, therefore, the life of the cable is lengthened, for it is well known that acute or sharp bends in a steel cable will very soon break the fibre thereof, and this the invention shown and described seeks to avoid. Moreover, it will be seen that the segments 5 are not curved on the line of a circle struck from the axis of the wheel, but are each curved about a shorter radius in such a manner that a sharp or acute bend in the cable does not occur at the yielding teeth on the two wheels, which latter are in the nature of sheaves or sprockets. For example, the straight stretch or portion 31 of the cable extends with an easy curve over the segments 5 adjacent the yielding teeth 17, and then extends with the straight portion 32 into the easy curve of the next segment 5, and then extends without a sharp bend into the straight stretch or portion 32, and so on around the wheel, thus avoiding sharp or acute bends in the cable at any point around the periphery of the wheel. When the screws 12 are operated to push the segments outward, the connected ends thereof then move outward to the line 33, as shown in Figure 3, thus pushing the cable outward a distance, but even when the rim segments are thus adjusted to what may be called the maximum pitch the cable is still without acute or sharp bends therein which would be calculated to endanger its strength and shorten its life. It will be understood, of course, that the flights or buckets 4 are so relatively placed on the cable that they properly engage the yielding teeth of the sheaves or sprocket wheels, in the manner shown, but when the cable stretches the said flights or buckets are in one sense thrown out of step with the spaces or gaps 13 and 21 on the two wheels, and it is to correct this that the rim segments of the wheels are then adjusted outward in the manner explained, thereby to take up the slack in the cable and enable the flights or buckets to travel around in step with the peripheral formations on the circumference of each wheel. Each segment 5, as shown and described, has its own individual axis or radius, instead of being curved about the axis of the wheel, and the consequence is that the straight stretches or portions of the cable alternate with the curved portions thereof, as the cable travels around the wheel, in a maner that tends to avoid acute or sharp bends in the cable, for even when the segments are adjusted to maximum pitch, as indicated by said line 33, there is no pronounced or sharp bulge in the periphery of the wheel. For example, as shown in Figure 3, the segments 5 have their outer edges curved about the centers or axes 34, between the radius lines 35 and 36, and it will be seen that the latter are disposed at right angles to the straight lines 37 which represent the straight stretches of the cable while traveling over the gaps or spaces 13, whereby the curvature of each segment is on the line of a circle which runs into but does not cross the line 37, so that no angle is formed which would make a sharp bend in the cable. The radius lines 35, it will be seen, are at right angles to the straight stretch of cable passing from one segment 5 to the other segment of the pair, or at right angles to the straight portion of cable between the two lines 35, whereby the straight portions of the cable alternate with the curved portions thereof in the manner shown, and whereby each curved portion of the cable has a shorter radius than the radius of the wheel, being curved about an axis which is some distance outward from the axis of the wheel. The cable travels around the wheel with straight portions thereof alternating with curved portions, each straight portion spanning a gap in the wheel, and each straight portion being tangential to two curved portions, by reason of the shorter radius of each segment 5, as previously explained. In effect, therefore, the circumference of the wheel is increased, when the segments 5 are forced outward, the devices for thus in effect increasing the circumference of the wheel being adapted to form straight stretches of the belt which are forcible outward away from the axis of the wheel, without disturbing the portions of the belt or cable at 37 over the gaps 13, thereby to tighten the belt on the sheave or sprocket or other wheel. It will be understood, of course, that each straight stretch here referred to is that relatively short portion of the cable as indicated at 38, which extends from one segment 5 to the other, over the movable joint at 8 between the two segments, as distinguished from the longer straight stretches or portions of the belt which span the gaps 13 or 21 in the wheels. The curved portions of the cable, indicated at 39, are pushed outward to tighten the belt. It will also be understood, of course, that while the apparatus shown and described is illustrated as being adapted for conveying materials by forcing or carrying them along, it is possible and quite common to use this type of conveyor for retarding the gravity flow or movement of materials, as in moving coal down hill, and in such case the apparatus is employed as a retarding conveyor to keep the materials from moving too fast.

It will be seen that the straight stretches of the cable, such as the one indicated at 38 in Figure 3, alternate with the curved portions 39, and that these three sections alternate with the straight stretches 37, but the latter are not the stretches which are pushed outward to in effect increase the diameter of the wheel and thereby tighten the belt thereon. When the straight stretches 38 are pressed outward, the curved stretches or portions 39 are also moved outward, but the straight stretches at 37 are not disturbed, but to the contrary the stretches 37 remain in position a fixed distance from the axis of the wheel. In Figure 3 the line 33 indicates the extent to which the diameter of the wheel may be increased, substantially, but with the proportions shown and described it may be increased even more than this. The pivoted members 14 and 17 swing about fixed axes 15 and 19 in the sense that these axes are not only fixed relatively to the members themselves, but are also fixed relatively to the wheel as a whole. Thus the wheel diameter increasing sections 5 alternate with the gap forming sections 28 and 29 of the wheel, in such a manner that the diameter of the wheel may in effect be increased without changing the distance between the flights 4 and the axis of the wheel.

What I claim as my invention is—

1. The combination of an endless belt, a wheel on which the belt is supported and devices on said wheel to in effect increase the circumference thereof, by forming successive straight stretches in the belt as it travels around the wheel, said devices being operative to force the straight stretches outward away from the axis of the wheel, without disturbing intermediate successive portions of the belt, thereby to take up slack and tighten the belt thereon.

2. A structure as specified in claim 1, said devices comprising segments arranged in pairs and adapted to engage the belt, each pair of segments being pivoted on the wheel and having their ends connected together at the center of the pair, and screw adjusting means provided at the center of each pair to force the joint between the segments outward and away from the axis of the wheel.

3. A structure as specified in claim 1, said devices comprising pivoted segments having means to engage said belt, and screw adjusting means for forcing the pivot joint between the segments outward away from the axis of said wheel.

4. A structure as specified in claim 1, said belt being provided with conveying means, and said wheel being provided with means for engaging and disengaging said conveying means, with means on the wheel to form longer successive straight stretches of the belt for said conveying means, and said devices comprising pivoted segments for engaging the belt, together with screw adjusting means to force the segments outward.

5. A structure as specified in claim 1, said wheel having removable sections thereon, together with pivoted members on said sections to engage and disengage the belt, and conveying means on said belt, with means on the wheel to form longer successive straight stretches of the belt for said conveying means, said devices comprising segments pivoted on said removable sections and provided with screw adjusting means to move the segments outward away from the axis of said wheel, in combination with springs to control said pivoted members to yieldingly hold them in their normal positions on the wheel.

6. A structure as specified in claim 1, said devices comprising peripheral segments curved about a radius shorter than the radius of the wheel, so that the belt while traveling around the wheel has curved portions which alternate with straight portions thereof, with each straight portion tangential to the curved portion, thereby to avoid sharp or acute bends in the cable.

7. A structure as specified in claim 1, said devices comprising peripheral segments arranged in pairs, with a joint between the members of each pair, and means for radially adjusting the joint to force the belt outward a distance away from the axis of the wheel.

8. A structure as specified in claim 1, said wheel being in the nature of a sprocket with gaps in the periphery thereof, and having pivoted and spring controlled yielding teeth at opposite sides of each gap, which gaps alternate with the said portions of the cable to be pushed outward, and said devices alternating with and being operable without disturbing said teeth, and said belt having means thereon at intervals to enter said gaps, said teeth being spring controlled to facilitate engagement with and disengagement from said means on the belt.

9. A structure as specified in claim 1, said devices comprising adjustable peripheral segments for the wheel, in combination with removable sections shaped to form gaps at intervals in the periphery of the wheel, each section being provided with a seat forming a pivot for one of said segments, and devices for moving the segments toward and away from the axis of the wheel and for holding them in adjusted position.

10. A structure as specified in claim 1, said devices comprising a pivotal joint opposite the middle of each straight stretch of the belt, and screw threaded means for adjusting said joint toward and away from the axis of the wheel, said joint being formed by two pivotally connected members which have their other ends pivoted at fixed points on the wheel, so that each member swings about its individual axis when forced outward by adjustment of said joint toward the belt.

11. A structure as specified in claim 1, said devices being adapted to form curved portions in the belt, which curved portions alternate with the straight stretches of the belt, and said wheel having gaps which also form other straight stretches in the belt, these other stretches being the portions which are not disturbed by the outward movement of said devices.

12. A structure as specified in claim 1, said devices comprising peripheral segments each curved about a shorter radius than the radius of the wheel, removable sections forming gaps at intervals in the periphery of the wheel, and forming pivots for the ends of said segments, and pivoted members mounted on said removable sections to engage the belt, together with means on said belt to enter said gaps in the periphery of the wheel, and springs for controlling the pivotal action of said members.

13. In conveying apparatus, the combination of a wheel, removable sections thereon forming gaps in the periphery of said wheel, a flexible member extending around said wheel, means on said cable to enter said gaps, and pivoted members on said removable sections to engage said flexible member, serving to facilitate the entry of said means on the flexible member into said gaps, as well as the movement of said means out of said gaps, together with springs to control said pivoted members.

14. A structure as specified in claim 13, one of said pivoted members being normally tilted toward the adjacent gap, and the opposite pivoted member of the same gap being normally tilted in the opposite direction.

15. A structure as specified in claim 13, in combination with means pivoted on said removable sections to press the flexible member outward to take up the stretch or slack therein.

16. A structure as specified in claim 13, said flexible member being a cable, and said pivoted members being bifurcated to engage said cable.

17. In conveying apparatus, the combination of a wheel having gaps in the periphery thereof, a flexible member extending around said wheel, means on said flexible member to enter said gaps, pivoted members at opposite sides of each gap to engage said flexible member, the pivot of each member being in fixed position thereon and on said wheel, and springs for controlling said pivoted members.

18. A structure as specified in claim 17, one of said pivoted members being normally tilted toward the adjacent gap, and the other pivoted member of each gap being normally tilted in the opposite direction, and all of said pivoted members being movable about their axes by said flexible member and said means thereon.

19. A structure as specified in claim 17, both of said pivoted members being normally tilted away from the gap between them, and this being the normal relation of said pivoted members to each gap.

20. In conveying apparatus, the combination of a wheel, a belt for said wheel, conveyor flights on said belt, means on said wheel to form gaps for said flights, and devices for tightening the belt by pushing outward certain portions thereof without changing the distance between said flights and the axis of the wheel.

21. A structure as specified in claim 20, said devices comprising adjustable peripheral portions alternating with said gaps in the periphery of the wheel.

22. A structure as specified in claim 20, said devices comprising adjustable peripheral sections adapted to form straight stretches in the belt, as it travels around said wheel, with a curved portion of the belt at each side of said straight stretches thereof, and said gaps forming other straight stretches which remain a fixed distance from the axis of the wheel.

23. A structure as specified in claim 20, said gap forming means comprising removable peripheral sections, and means for removably holding these sections on the wheel.

24. A structure as specified in claim 20, said gap forming means having pivoted members at opposite sides of each gap to facilitate the entrance and departure of the flights into and out of said gaps.

25. A structure as specified in claim 20, said devices comprising peripheral sections each having one end pivoted at a point adjacent one of said gaps, and means for moving the other ends of said sections outward to in effect increase the diameter of the wheel.

26. A structure as specified in claim 20, said devices comprising a pair of peripheral sections disposed between each two successive gaps, and means for adjusting these peripheral sections outward to in effect increase the diameter of the wheel at points alternating with said gaps around the periphery of the wheel.

EUGENE E. LANDAHL.